United States Patent [19]

Clark

[11] 4,140,903
[45] Feb. 20, 1979

[54] PRECISION SPEED CONTROL FOR OPTICAL SCANNERS

[75] Inventor: Robert D. Clark, Carrollton, Tex.

[73] Assignee: Xerox Corporation, Stamford, Conn.

[21] Appl. No.: 756,511

[22] Filed: Jan. 3, 1977

[51] Int. Cl.² .............................................. H01J 3/14
[52] U.S. Cl. ........................................ 250/236; 350/6.7
[58] Field of Search ............... 250/548, 216, 234, 235, 250/236; 350/6.1, 6.7; 358/199, 206

[56] References Cited

U.S. PATENT DOCUMENTS

| | | | |
|---|---|---|---|
| 3,091,699 | 5/1963 | Hammar | 250/236 |
| 3,804,976 | 4/1974 | Gard | 250/236 |
| 4,017,146 | 4/1977 | Lichtman | 350/6.7 |

*Primary Examiner*—David C. Nelms
*Attorney, Agent, or Firm*—Irving Keschner; Franklyn C. Weiss

[57] ABSTRACT

A motor speed control system for reducing instantaneous speed variations as a result of hunting in hysteresis synchronous motors utilized to drive optical scanners by controlling the drive voltage applied to the motor windings. A laser beam is reflected from the facets of the optical scanner and scans a surface along a scan line, a signal being generated at the start of each scan line. The start of scan signal is amplified and compared in a phase detector with a reference frequency corresponding to the desired optical scanner speed. The phase detector generates a voltage signal representing the phase difference between the start of scan signal and the reference frequency due to variations in the motor speed. This signal is then modulated. The resultant signal modulates the amplitude of both of the signals utilized to drive the motor field windings, the motor torque being adjusted in response to this drive signal charge whereby the hunting in the motor is effectively damped out.

9 Claims, 7 Drawing Figures

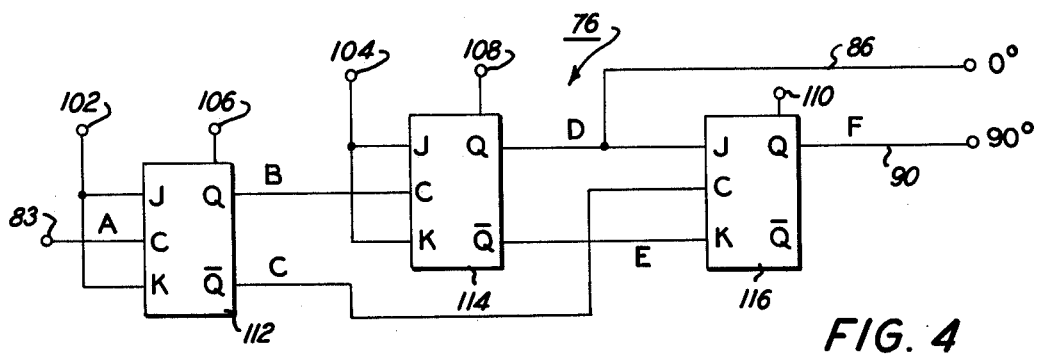
FIG. 4
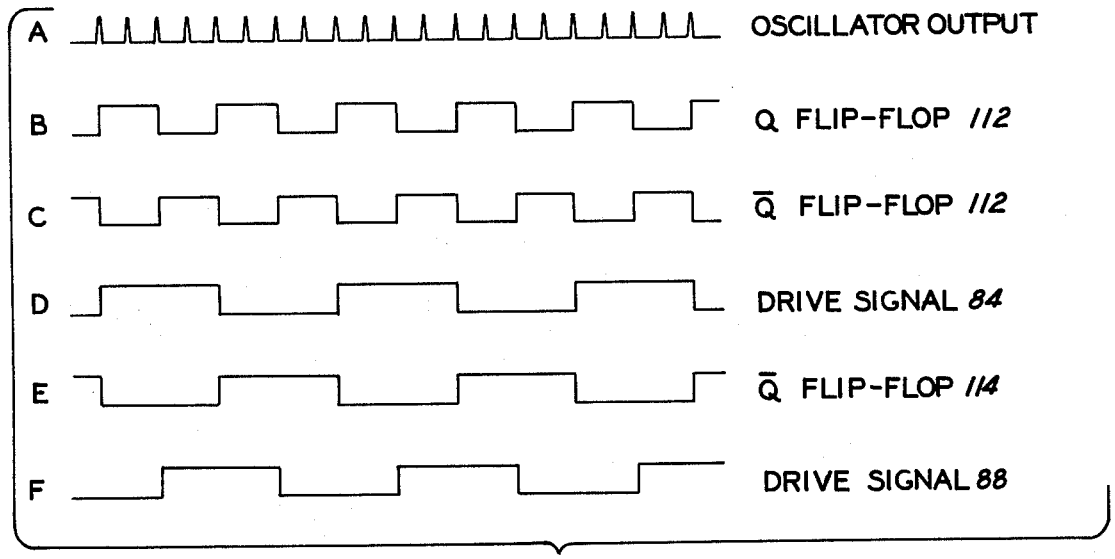
FIG. 5
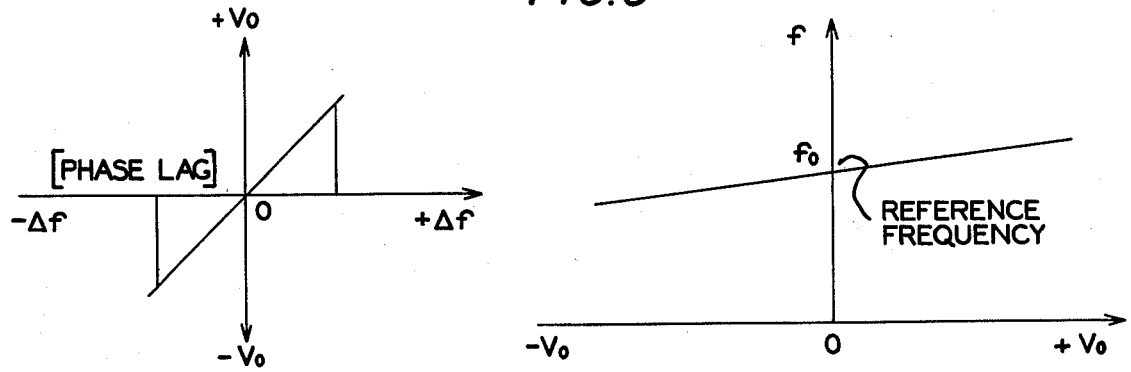
FIG. 3A
FIG. 3B
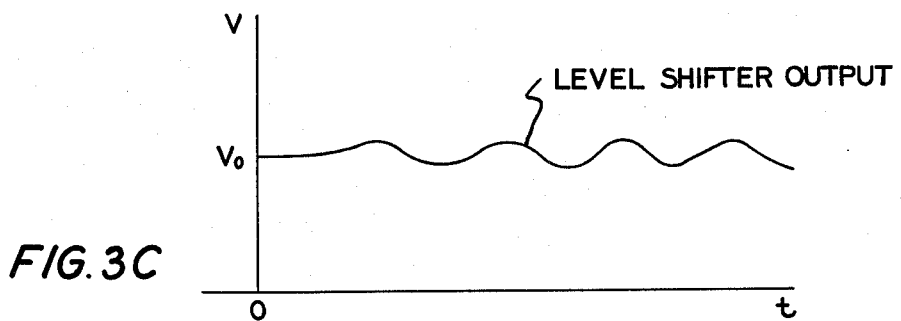
FIG. 3C

PRECISION SPEED CONTROL FOR OPTICAL SCANNERS

BACKGROUND OF THE INVENTION

The use of a laser beam for scanning an original and/or recording information on a laser sensitive medium has been disclosed in the prior art as shown, for example, in U.S. Pat. No. 3,946,150. For recording purposes, a laser beam is directed to a modulator which modulates the laser beam in accordance with information to be printed on the laser sensitive medium, such as a charged xerographic surface. The modulator beam is directed to a rotating optical scanner, driven by a motor, which acts to scan the beam across the xerographic surface.

While for relatively low-accuracy requirements the motor driving the rotating scanner can be made to function adequately without speed sensing and feedback control, this generally can only be accomplished by careful and perhaps expensive attention to the elimination of all sources of disturbances of the motor.

It has been found that for accurate speed control at relatively high speeds a hysteresis synchronous motor would be preferable to drive the rotating scanner. However, these motors tend to exhibit characteristic speed variations called "hunting". Hunting is inherent in systems using hysteresis synchronous motors because of time lags in the response caused principally by energy storage in the circuit inductances, especially in the field-winding inductances. Thus, a sudden change in the motor shaft load causes a deviation in the speed from its set value and correction of the speed cannot take place without the lapse of a definite time to permit readjustment of the stored energies. This time lag between disturbance and response may result in successive over-shooting and under-shooting of the correct speed, representing serious oscillations about the final speed value.

The prior art discloses various systems for controlling the speed at which a synchronous motor operates, such as those disclosed, for example, in U.S. Pat. Nos. 3,144,595 and 3,723,908. However, the prior art systems do not provide the precise speed control required in high resolution and close registration tolerance optical scanning systems.

SUMMARY OF THE PRESENT INVENTION

The present invention provides a motor speed control system for reducing instantaneous speed variations as a result of hunting in hysteresis synchronous motors utilized to drive optical scanners by controlling the drive voltage applied to the motor windings. A laser beam is reflected from the facets of the optical scanner and scans a surface along a scan line, a signal being generated at the start of each scan line. The start of scan signal is amplified and compared in a phase detector with a reference frequency corresponding to the desired optical scanner speed. The phase detector generates a voltage signal representing the phase difference between the start of scan signal and the reference frequency due to variations in the motor speed. This signal is then modulated. The resultant signal modulates the amplitude of both of the signals utilized to drive the motor field windings, the motor torque being adjusted in response to this drive signal change whereby the hunting in the motor is effectively damped out.

It is an object of the present invention to provide a control system for controlling the speed of a motor.

It is a further object of the present invention to provide a control system for precisely controlling the speed of a motor, the motor driving an optical scanner.

It is still a further object of the present invention to provide a speed control system for reducing the speed variations of a hysteresis synchronous motor due to its hunting characteristic.

It is an object of the present invention to provide a control system for precisely controlling the speed of a motor, the motor driving an optical scanner utilized in laser scanning applications.

BRIEF DESCRIPTION OF THE DRAWINGS

For a better understanding of the invention as well as other objects and further features thereof, reference is made to the following description which is to be read in conjunction with the following drawings wherein:

FIGS. 3(a)-3(c) are waveforms generated within the block diagram of FIG. 2;

FIG. 4 is a schematic diagram of the phase shift and divider circuit shown in the block diagram of FIG. 1; and FIG. 5 are waveforms associated with the schematic diagram of FIG. 4.

DESCRIPTION OF THE PREFERRED EMBODIMENT

Figure 1:
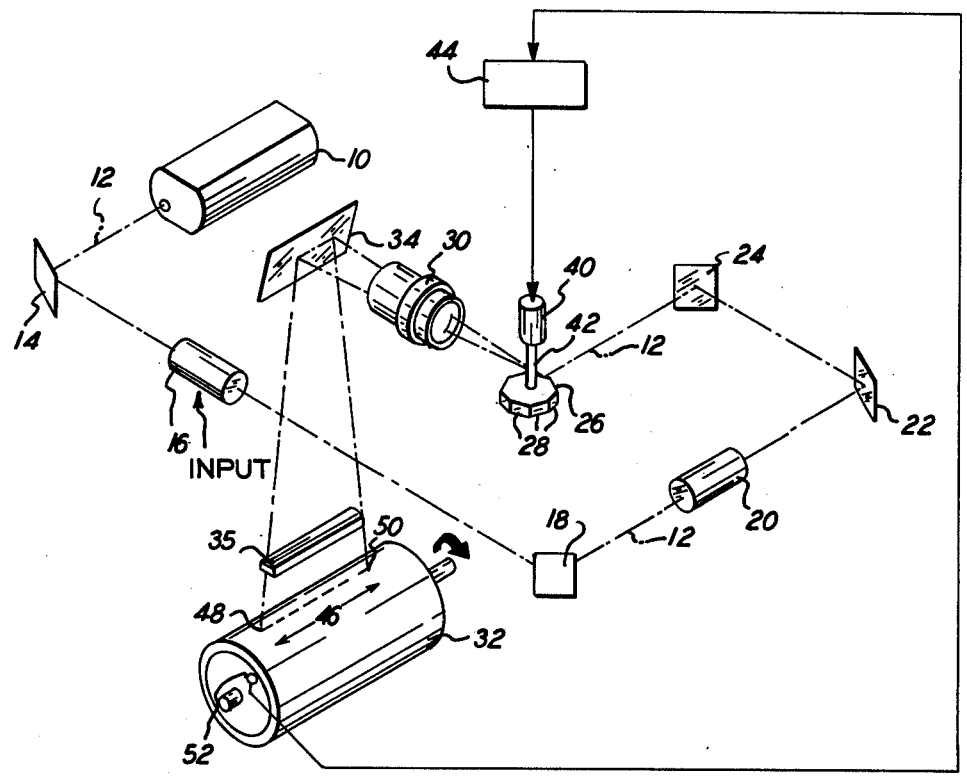
FIG. 1 is an isometric illustration of a scanning system in which the present invention can be utilized.

In FIG. 1, an embodiment of a scanning system in which the present invention can be utilized is shown. A flux source 10 provides the beam of flux for utilization by the scanning system. The flux source 10 is preferably a laser which generates a collimated beam 12 of monochromatic radiation which is reflected by a mirror 14 to be modulated by modulator 16 in conformance with the information contained in an electrical signal.

Modulator 16 may be any suitable electro-optical modulator for imparting the information to the beam 12. The modulator 16 may be, for example, a Pockel's cell comprising a potassium dihydrogen phosphate crystal, whose index of refraction is periodically varied by the application of the varying voltage which represents the electrical signal. The signal may contain information either by means of binary pulse code modulation or wideband frequency code modulation.

The beam 12 is reflected from a mirror 18 to an astigmatic lens configuration 20. The configuration 20 focuses the beam 12 to a controlled energy distribution which is reflected from mirrors 22 and 24 to impinge upon one or more facets of a scanning polygon 26.

In the preferred embodiment, the rotational axis of polygon 26 is orthogonal to the plane in which light beam 12 travels. The facets 28 of the polygon 26 are mirrored surfaces suitable for the reflection of any radiated flux impinging upon them. Alternatively, flying spot scanning could be provided by any other suitable device, such as mirrored piezoelectric crystals or planar reflecting mirrors which are driven in an oscillatory fashion.

At a distance from the leading illuminated facet of the polygon 26 is positioned an imaging lens 30. As shown, the lens 30 is located in the optical path between the polygon 26 and the medium 32. The lens 30 is of a diameter to cooperate with the respective reflected light beams throughout each scan to focus them to a spot in a focal plane proximate the surface of recording medium 32 after being reflected from a mirror 34.

The lens 30 is designed to insure that it provides a linear relationship between the rotation of the polygon 26 and the deflection of the spot in the transverse direction at the recording medium 32. This linearization by optical means prevents barrel or pincushion-type distortion effects without the need for electrical compensation.

The aforementioned U.S. Pat. No. 3,946,150 discloses the preferred configuration for the lens 20 and 30 and the teachings of this patent necessary for the understanding of the present invention are incorporated herein by reference.

The polygon 26 is continuously driven preferably by a hysteresis synchronous motor 40 via drive shaft 42 and may be synchronized in rotation to a synchronization signal representative of the scan rate used to obtain the original input signal. In the case of the utilization of a xerographic drum as the recording medium, the rotation rate of the drum determines the spacing of the scan lines. It should be noted that a cylindrical lens 35 may be interposed between mirror 34 and recording medium 32 to compensate for misalignments of optical elements as set forth in the aforementioned patent.

In order to compensate for speed variations of the optical scanner 26 caused by the hunting characteristic of motor 40, a speed control system 44, described in more detail hereinafter, is provided to control motor 40. As scanner 26 is caused to rotate, the light beam 12 is caused to trace a scan line 46 on the surface of recording medium 32, starting at location 48 and ending at location 50. A photodetector 52 is provided under a transparent portion of the surface of recording medium 32 to generate a signal when light beam 12 reaches location 48. In other words, detector 52 generates a start of scan signal which, due to the rotation of polygon 26, is in the form of a pulse train whose phase (frequency) is dependent on the speed of scanner polygon 26. Any variations of scanner speed due, for example, to the hunting characteristic of motor 40, is detected by the change in phase of the pulse train generated by detector 52.

As disclosed in U.S. Pat. No. 3,950,146, medium 32 may be a xerographic drum (as shown) which rotates consecutively through a charging station, an exposure station where the beam from the rotating polygon 26 would traverse a scan line 46 on the drum, through a developing station, a transfer station where a web of copy paper is passed in contact with the drum and receives an electrostatic discharge to induce a transfer of the developed image from the drum to the copy paper. A fusing device can fix the images to the copy paper.

Usable images are provided in that the information content of the scanning spot is represented by the modulated or variant intensity of light respective to its position within the scan line 46. As the spot traverses a charged surface through a given scan angle, the spot dissipates the electrostatic charge in accordance with its light intensity. The electrostatic charge pattern thus produced would be developed in the developing station and then transferred to the final copy paper. The xerographic drum would be cleaned by some cleaning device such as a rotating brush before being recharged by the charging device. In this manner, the information content of the scanned spot is recorded on a more permanent and useful medium. Of course, alternative prior art techniques may be employed to cooperate with a scanned spot in order to utilize the information contained therein.

Figure 2:
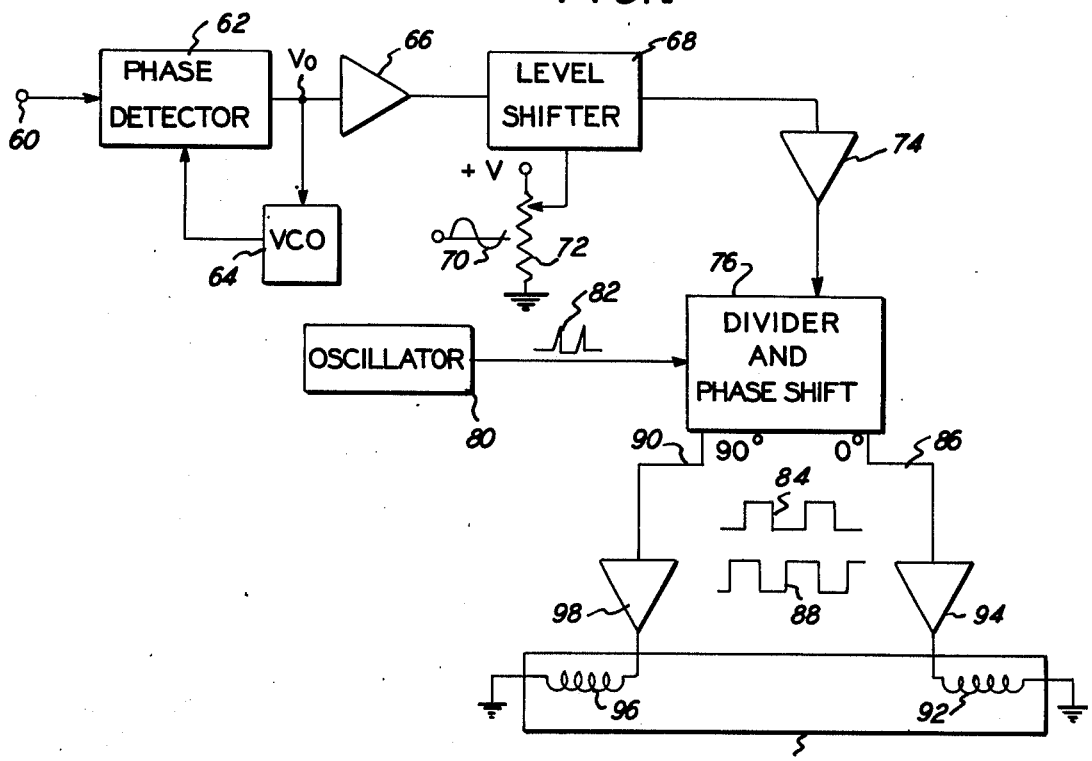
FIG. 2 is a block diagram of the speed control system of the present invention.

Referring now to FIG. 2, a block diagram of speed control system 44 is illustrated. The pulse train generated by photodetector 52 is applied to input terminal 60 of phase detector 62. The output Vo of phase detector 62 is connected to a voltage controlled oscillator (VCO) 64. VCO 64 generates a train of pulses the frequency of which is dependent upon the magnitude of the voltage applied to its input. The output of VCO 64 is fed back to a second input of phase detector 62 as shown. Phase detector 62 is arranged to generate a voltage Vo which is proportional to the phase difference between the detector generated pulse train and the pulse train generated by VCO 64. When the voltage output from phase detector is zero, VCO 64 is arranged to generate a pulse train which corresponds to the desired scanner speed. Phase detector 62, VCO 64 and the feedback connection form a phase locked loop. As shown in the figure, Vo may be amplified by amplifier 66 prior to being coupled to a level shifter 68. An offset voltage 70, chosen to set the proper bias voltage level, $V_B$, to the divider and phase shift network 76, is applied to the other terminal of level shifter 68 via the adjustable tap of potentiometer 72. The resultant output of level shifter 68 is an alternating, or modulated, voltage which is applied to an amplifier 74.

FIGS. 3(a) and 3(b) show the voltage and frequency characteristics of phase 62 and VCO 64, respectively. As illustrated in FIG. 3(a), the phase detector output Vo is a positive D.C. voltage when the phase of the reference frequency from VCO 64 leads the phase of the pulse train generated by photodetector 52 and Vo is a negative D.C. voltage when the phase of the reference frequency lags the phase of the pulse train generated by photodetector 52. The output of VCO 64, as shown in FIG. 3(b), is linearly related to Vo, positive values for Vo increasing the frequency of VCO 64 from the reference frequency of Vo and negative values of Vo decreasing the frequency output of VCO 64 from the reference frequency Vo. FIG. 3(c) shows a typical output from level shifter 68 wherein the D.C. output of level shifter 68 alternates about $V_B$.

The output of amplifier 74 is connected to one input of a divider and phase shift circuit 76, the other input thereof being coupled to the output of an oscillator 80 which generates a train 82 of pulses. The divider and phase shift circuit 76, described in detail hereinafter with reference to FIGS. 4 and 5, provides a pulse train 84 on lead 86 which is 90° out of phase with a pulse train 88 on lead 90. The output on lead 86 is coupled to field winding 92 of motor 40 via power amplifier 94 and the output on lead 90 is coupled to field winding 96 of motor 40 via power amplifier 98. The amplitude of the pulse trains 84 and 88 are directly proportional to the output of amplifier 74.

Motor 40, as set forth hereinabove, is preferably a hysteresis synchronous motor and, as is well known in the art, the motor torque is dependent upon the current-(voltage)applied to its quadrature windings 92 and 96. This assumes that the aforementioned 90° phase difference between signals 84 and 88 remain constant.

When motor 40 is in synchronism, the current flowing into the winding sets up a magnetic field rotating at a synchronous speed with respect to the winding. This armature field consists of a set of consequent poles equal in number to that corresponding to the winding arrangement; and there is a tendency for the field poles (assumed to be excited) to lock into position with the armature poles, a north pole in the armature "holding on" to a south pole of the field system. This "interlocking" action between the armature and the field poles is not an absolutely rigid one. The coupling between the armature and rotor is represented by the drag between two sets of poles of opposite polarities, and it is well known that the pull between such poles acts as though the lines of magnetic force were stretched elastic bands. It follows that the rotor position may at any instant be either slightly ahead of, or slightly behind, the corresponding position of the armature field, which means that the speed of the synchronous motor may oscillate, or hunt, being first slightly greater, then slightly less, than that of the uniform speed of the rotating armature field. Assuming a nominal mechanical load, the rotor will lag the armature field around which the above-described oscillations will occur. If that nominal load causes a lag angle $\theta$, an increase in load will cause the lag angle to increase to $\theta + \Delta \theta$. In general, however, inertia of the rotor and its load prevents an instantaneous adjustment to the changed load conditions, with the result that the rotor swings back somewhat beyond the position of equilibrium, thereby developing torque in excess of the load requirement and so not only checking the initial reduction in speed but increasing it slightly above synchronous speed. In this manner, there is set up a periodic swinging of the rotor first to one side, then to the other, of the new position of equilibrium, this oscillation being superimposed upon the uniform synchronous speed of rotation.

The circuit shown in FIG. 4 uses three conventional J-K flip-flops (F-F) 112, 114, and 116. The output of the oscillator 80 (FIG. 2), as shown in FIG. 5A, is used to clock circuit 76. The output is applied to the clock input of F-F 112 via lead 83. The oscillator output depends on the speed of the motor, the motor drive frequency and the number of poles the motor has. A positive logic state is applied by an external source (not shown) to the J & K inputs of F-Fs 112 and 114 via leads 102 and 104. A supply voltage from an external source (not shown) is applied to F-F 112 via lead 106. The output (FIG. 3c) of the amplifier 74 is applied as a supply voltage to F-Fs 114 and 116 via leads 108 and 110.

The circuit operates in the following manner. F-F 112 toggles with each clock pulse to produce wave form 5B at the Q output and wave form 5C at the $\overline{Q}$ output. The Q output provides the clock pulse for F-F 114 and the $\overline{Q}$ output provides the clock pulse for F-F 116. F-F 114 toggles with its clock to produce wave form 5D at the Q output and wave form 5E at the $\overline{Q}$ output. The Q output provides the drive signal 84 on lead 86 to amplifier 94, as well as the J input to F-F 116. The $\overline{Q}$ output provides the K input to F-F 116. In response to the clock rate and the states of J & K F-F 116 produces an output 5F at Q, 90° out of phase with the Q output of F-F 114. This output provides a drive signal 88 on lead 90 to amplifier 98. It should be noted that the magnitude of wave forms 5D and 5F are proportional to the output of the level shifter 68.

While the invention has been described with reference to its preferred embodiment, it should be understood by those skilled in the art that various changes may be made and equivalents may be substituted for elements thereof without parting from the true spirit and scope of the invention. For example, the output from amplifier 74 may be used to replace the external sources applied to leads 102, 104 and 106. In addition, many modifications may be made to adapt a particular situation or material to the teaching of the invention without departing from its essential teachings.

What is claimed is:

1. In an apparatus having a motor driven rotating polygon for scanning a beam of radiation across a medium in successive scans, a motor speed control system comprising:

scan signal means for generating a start of scan signal;
speed signal means for generating a signal representing the desired scan speed;
error means for generating a signal representing the difference between said scan signal and said speed signal;
drive signal means for dividing said error signal into first and second drive signals, whose magnitudes are proportional to said error signal, said signals being 90° out of phase with each other; and
means for coupling said first and second drive signals to the field windings of said motor.

2. The system of claim 1 wherein said scan signal means comprises a photodetector positioned to receive said radiation at the beginning of each scan across said medium.

3. The system of claim 2 wherein said photodetector is positioned under a transparent portion of said medium.

4. The system of claim 1 wherein said speed signal means comprises a voltage controlled oscillator which generates a signal representing said desired scan speed, said signal being proportional to the magnitude of a voltage applied to the input of said oscillator.

5. The system of claim 4 wherein said error means comprises a phase detector which receives said scan signal and said speed signal, and generates an error signal which is fed to the input of said voltage controlled oscillator and to said drive signal means.

6. The system of claim 1 wherein said drive signal means comprises:

means for applying an offset voltage to said error signal; and
means for dividing said offset error signal into first and second drive signals, whose magnitudes are proportional to said offset error signal, said drive signals being 90° out of phase with each other.

7. The system of claim 1 wherein said motor is a hysteresis synchronous motor.

8. For use in an apparatus having a motor driven rotating polygon for scanning a beam of radiation across a medium in successive scans, a motor speed control system for reducing speed variations in a hysteresis synchronous motor having first and second field windings comprising:

a phase detector having first and second inputs and an error signal output;
means connected to said first input for generating a signal representing the start of each scan;
a voltage controlled oscillator in circuit with said output and said second input of said phase detector, said oscillator generating a signal representing the desired scan speed, said signal being proportional to an error signal generated by said phase detector, said error signal being proportional to the phase difference between said scan signal and said oscillator output;
drive signal means responsive to said error signal for generating first and second drive signals whose magnitudes are proportional to said error signal, said drive signals being 90° out of phase with each other; and means for applying to said first and second drive signals to said first and second field windings, respectively.

9. The system of claim 8 wherein said drive signal means comprises:

means for applying an offset voltage to said error signal; and means for dividing said offset error signal into first and second drive signals whose magnitudes are proportional to said offset error signal, said signals being 90° out of phase with each other.

* * * * *